United States Patent [19]

Ritter

[11] Patent Number: 5,001,001
[45] Date of Patent: Mar. 19, 1991

[54] PROCESS FOR THE FABRICATION OF CERAMIC MONOLITHS BY LASER-ASSISTED CHEMICAL VAPOR INFILTRATION

[75] Inventor: Joseph J. Ritter, Mt. Airy, Md.

[73] Assignee: The United States of America as represented by the Secretary of Commerce, Washington, D.C.

[21] Appl. No.: 411,984

[22] Filed: Sep. 25, 1989

[51] Int. Cl.$^5$ .......................... B32B 7/02; B32B 5/14; B05D 3/06

[52] U.S. Cl. .................................. 428/218; 427/53.1; 427/248.1; 427/372.2; 428/310.5; 428/312.4; 428/312.6; 428/312.8

[58] Field of Search ................. 427/53.1, 248.1, 372.2; 219/121.85; 428/212, 218, 310.5, 312.4, 312.8, 312.6

[56] References Cited

U.S. PATENT DOCUMENTS

| | | |
|---|---|---|
| 3,379,555 | 4/1968 | Hough . |
| 3,947,653 | 3/1976 | Fairbairn . |
| 4,016,013 | 4/1977 | Bitzer . |
| 4,157,923 | 6/1979 | Yen et al. . |
| 4,212,900 | 7/1980 | Serlin . |
| 4,248,909 | 2/1981 | Whittaker . |
| 4,434,189 | 2/1984 | Zaplatynsky . |
| 4,472,454 | 9/1984 | Houdayes et al. .................. 427/228 |
| 4,552,786 | 11/1985 | Berneberg et al. . |
| 4,569,855 | 2/1986 | Matsuda et al. . |
| 4,574,459 | 3/1986 | Peters . |
| 4,729,341 | 3/1988 | Fournier et al. ...................... 427/38 |
| 4,810,580 | 3/1989 | Rice . |
| 4,822,751 | 4/1989 | Ishizu et al. . |
| 4,828,874 | 5/1989 | Hiraoka et al. . |

OTHER PUBLICATIONS

"Advanced Ceramics by Chemical Vapor Deposition Techniques", Amer. Cer. Soc. Bull., 67, (1988), 350.

Primary Examiner—Stanley Silverman
Attorney, Agent, or Firm—Thomas Zack; Alvin J. Englert; Viviana Amzel

[57] ABSTRACT

A method of forming a ceramic monolith comprises exposing a pre-formed metal substrate to a NaCl filtered continuous wave laser beam of about 50 to 100 W power and about 80 to 315 W/cm$^2$ power density in an atmosphere of a gas desired to react with the metal, allowing for the gas to diffuse into the metal substrate at a temperature effective to permit reaction thereof to form the ceramic monolith, and cooling the monolith.

14 Claims, 4 Drawing Sheets

PROCESS FOR THE FABRICATION OF CERAMIC MONOLITHS BY LASER-ASSISTED CHEMICAL VAPOR INFILTRATION

FIELD OF THE INVENTION

The present invention adds a new dimension to the fabrication of ceramic monoliths by providing a novel method involving laser-assisted chemical vapor infiltration (LACVI). This method is rapid and utilizes inexpensive starting materials while doing away with prior art steps such as powder synthesis, calcining and sintering.

DESCRIPTION OF BACKGROUND

Chemical vapor deposition (CVD) is a process by which a solid material is deposited from gaseous precursors into a heated substrate. Within the past two decades, CVD processing has been directed into a very successful industry for the fabrication of microelectronic devices. Moreover, the use of CVD processing for the fabrication of high performance cutting tools and high temperature coatings is expanding rapidly.

A recent review on advanced ceramics by CVD has summarized the significant developments in this field (David P. Stinton, Theodore M. Bessman and Richard A. Lawden, "Advanced Ceramics by Chemical Vapor Deposition Techniques", Amer. Cer. Soc. Bull., 67, (1988), 350, and references therein). These developments fall into three categories as follows.

(1) surface modification by CVD,
(2) composite fabrication by chemical vapor infiltration (CVI) and
3) CVD formation of thin films for electronics applications.

Examples of related prior art encompass the following patents.

U.S. Pat. No. 3,379,555 to Hough describes the coating of a substrate such as tungsten with graphite. This is done by heating a filament of tungsten to 3500° C. and contacting the filament with a gas mixture of argon and an amine of an alkyl hydrocarbon such as methane.

U.S. Pat. No. 4,016,013 to Bitzer et al discloses the use of heat or radiant energy for depositing the fusing layers of carbides or nitrides on a metal or metalloid such as silicon or molybdenum. Compounds like triazines or pyrimidines are made to react with the substrate. Additives such as methane and ammonia as sources of carbon and nitrogen are also described. The substrate can be in the form of a powder or a machined article and the reactor is described as being of the CVD type.

U.S. Pat. No. 4,248,909 to Whittaker describes the preparation of an optical coating where a laser beam is focused on a graphite rod to produce gaseous carbon. The substrate can be a metal or a non-metallic crystalline solid. Upon impingement on the substrate surface the carbon gas is quenched to form a carbine film.

U.S. Pat. No. 4,434,189 to Zaplatynsky describes the coating by alloying or forming TiN on the metal substrate surface, preferably of titanium and titanium alloys. This is done by nitriding. A laser beam of the carbon dioxide type is passed through a sodium chloride window to strike the substrate, thereby causing rapid heating. The heated substrate reacts with nitrogen which forms first a solid solution and then titanium nitride. It is stated that the process may be used in the formation of ceramic coatings on ceramic materials.

U.S. Pat. No. 4,552,786 teaches the use of a supercritical fluid such as carbon dioxide to carry ceramic precursors such as polycarbosilane polymers into the pores of a ceramic substrate. Materials such as aluminum borosilicate are exemplified as the ceramic substrate (see, Example 4, Col. 4 of the patent). The polysilane is dissolved in this supercritical fluid and then infiltrated into the borosilicate. Moreover, it is only a small area of the substrate surface which is treated at any one time and the power density of the laser ray which is utilized is at least 20,000 W/cm$^2$, substantially higher than in the inventive method.

U.S. Pat. No. 4,574,459 describes the preparation of extrusion dies suitable for fabrication of ceramic monoliths where steel is coated with a compound such a titanium carbide by the CVD process.

U.S. Pat. No. 4,569,855 to Matsuda et al describes the deposition of a film such as a semiconductor film on a metal substrate such as molybdenum (see Col. 5, lines 40-42 of Matsuda et al). A silicon compound having azo or azide groups is excited by a laser beam and decomposed to form a gas. A uniform deposition film is formed. This method is known as a photo-CVD method.

U.S. Pat. No. 4,822,751 to Ishizu et al provides a method for forming a thin film semiconductor device by producing a patterned metal film on a substrate and depositing by CVD. The patterned film is placed in a $SiH_4$ atmosphere and illuminated with an argon laser beam which gemrates heat to decompose the $SiH_4$ gas beam which generates heat to decompose the $SiH_4$ gas giving silicon, which is then deposited on the thin film in an aligned manner.

U.S. Pat. No. 4,810,580 describes the nitridation of silicon atoms in clay by reaction of the clay with ammonia at temperatures above 1000° C. The result is the formation of silicon nitride groups and the product is said to be useful in ceramics.

U.S. Pat. No. 4,828,874 to Hiraoka et al describes surface treatment of polycrystalline silicon by chlorine gas particles excited with a laser light. The treatment is said to be for the manufacture of surface elements.

U.S. Pat. No. 3,947,653 to Fairbairn discloses a surface treatment for metallic articles which comprises forming a eutectic surface on a metal article by means of high density energy and heating to a temperature between the surface melting temperature and a surface vaporization temperature for a short period of time to melt the surface layer and cooling at a specified rate.

U.S. Pat. No. 4,157,923 to Yen et al. describes a method for increasing the physical properties of nonallotrophic metals by means of a high energy beam of at least 10,000 W/cm$^2$ to produce a rapid self-quenching rate and produce a precipitate and/or intermetallic compound in the resolidification zone.

U.S. Pat. No. 4,212,900 to Serlin describes a method for allowing the surface of a substrate by directing a beam of high intensity energy and alloying material placed on the surface of the substrate.

DESCRIPTION OF THE INVENTION

This invention relates to a method of forming a ceramic monolith, comprising
 exposing a pre-formed metal substrate to a NaCl filtered continuous wave laser beam of about 50 to 100 W power and about 80 to 315 W/cm$^2$ power density in an atmosphere of a gas desired to react with the metal;

allowing for the gas to diffuse into the metal substrate at a temperature effective to permit reaction thereof to form the ceramic monolith; and cooling the monolith.

Also part of this invention is a ceramic monolith prepared by a method comprising exposing a pre-formed metal substrate to a NaCl filtered continuous wave laser beam of about 50 to 100 W power and about 80 to 315 W/cm$^2$ power density in an atmosphere of a gas desired to react with the metal;

allowing for the gas to diffuse into the metal substrate at a temperature effective to permit reaction thereof to form the ceramic monolith; and cooling the monolith.

A more complete appreciation of the invention and many of the intended advantages thereof will be readily perceived as the same becomes better understood by reference to the following detailed description when considered in connection with the accompanying figures.

BRIEF DESCRIPTION OF THE DRAWINGS

FIG. 2 shows a SiC bushing, FIG. 3 shows a SiC piston crown, FIG. 4 shows a SiC/Si$_3$N$_4$ bushing, FIG. 5 shows a Mo$_2$S disc and FIG. 6 shows a WC disc.

Figure 1:
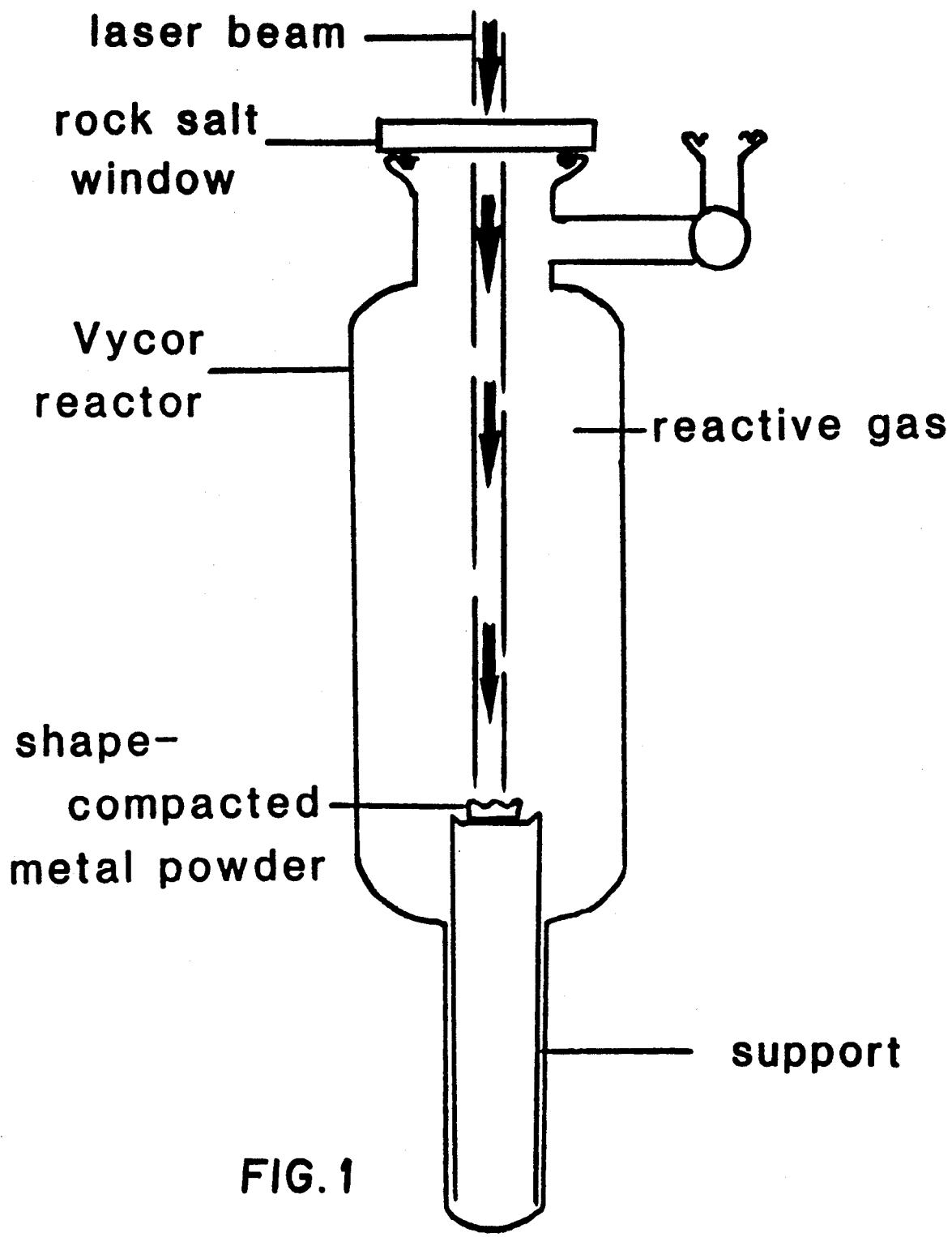
FIG. 1 shows a drawing of a preformed, substrate placed on a support within a reaction chamber. Also shown is a laser beam which enters the chamber through a sodium chloride window and impinges on the substrate.
Figure 2:
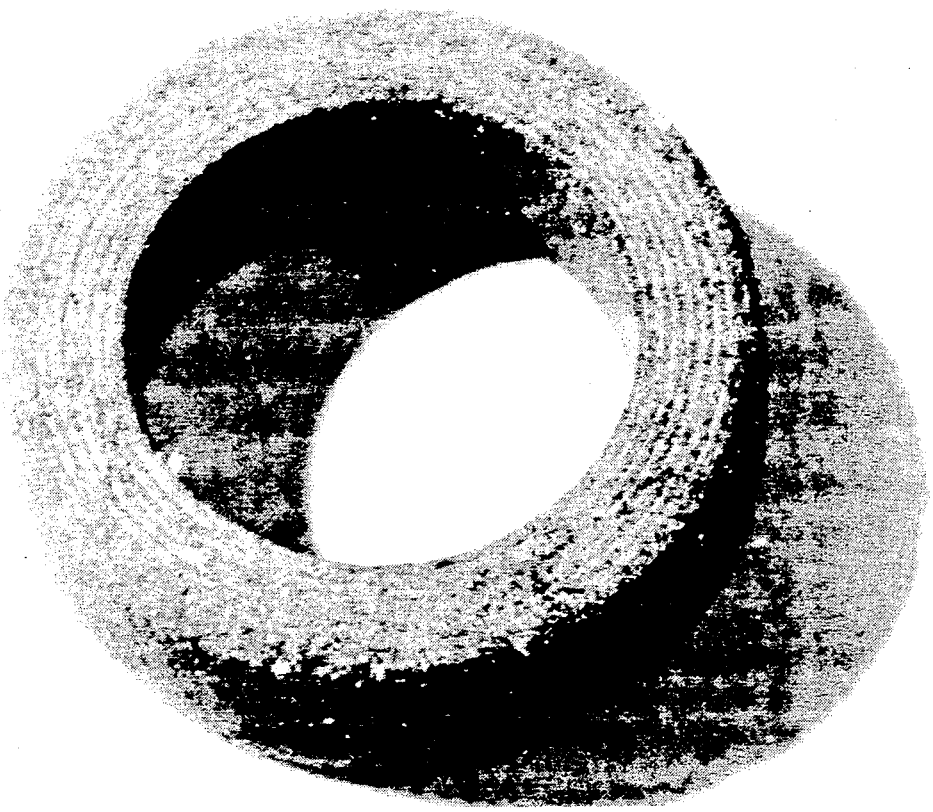
FIGS. 2 through 6 show prototypes of finished products (ceramic monoliths) prepared in accordance with the present invention.
Figure 3:
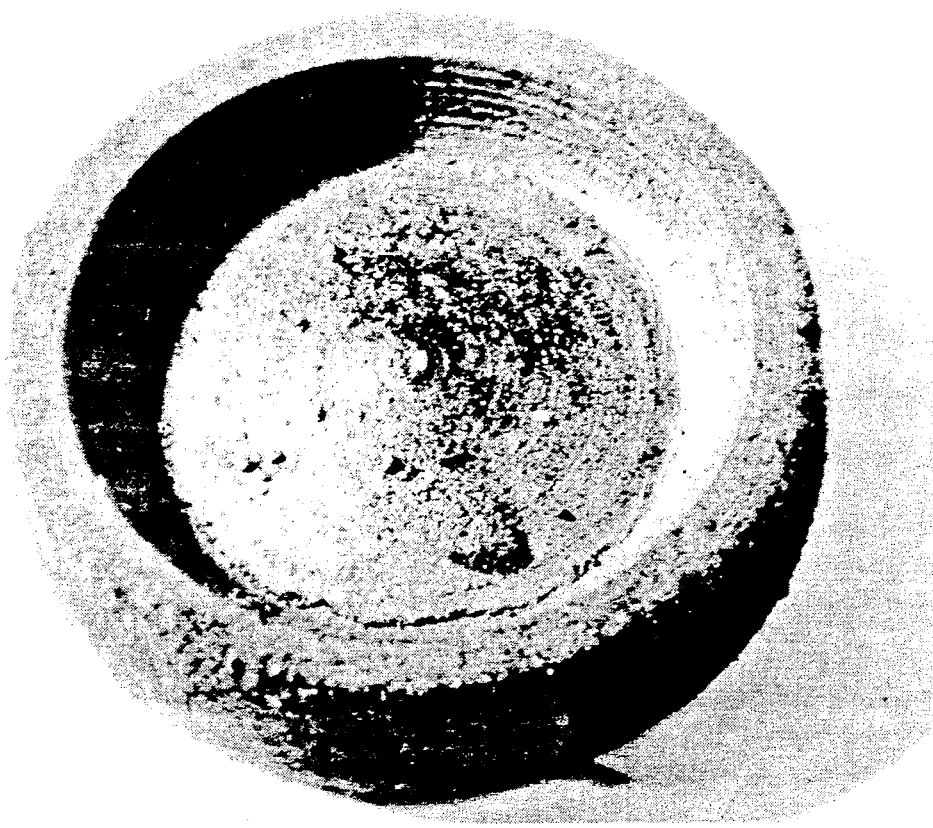
Figure 4:
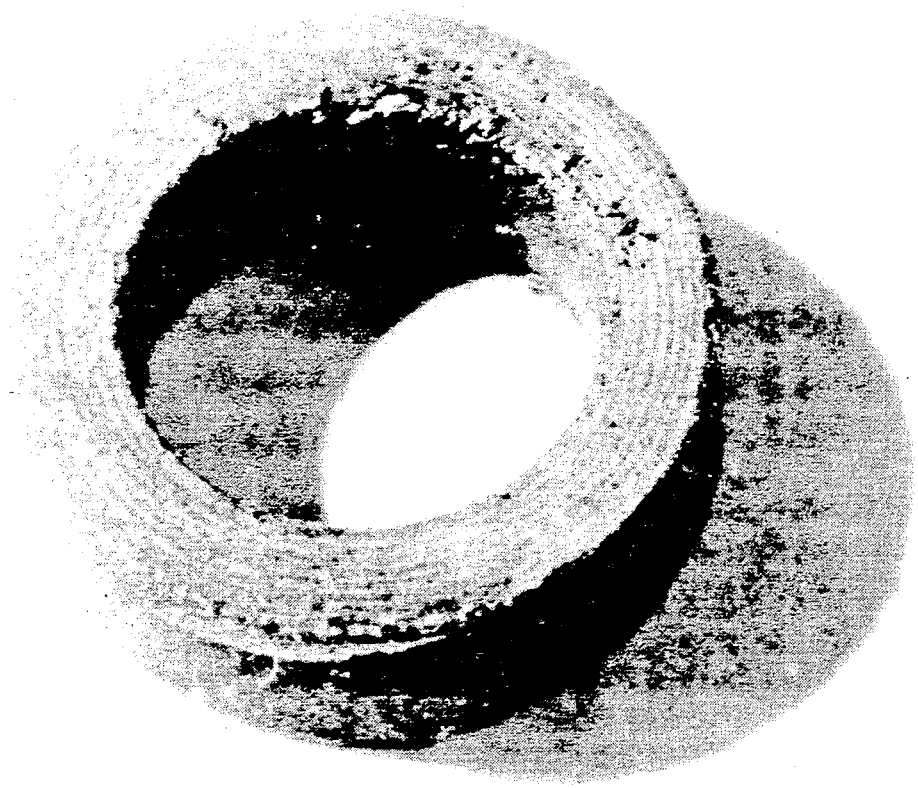
Figure 5:
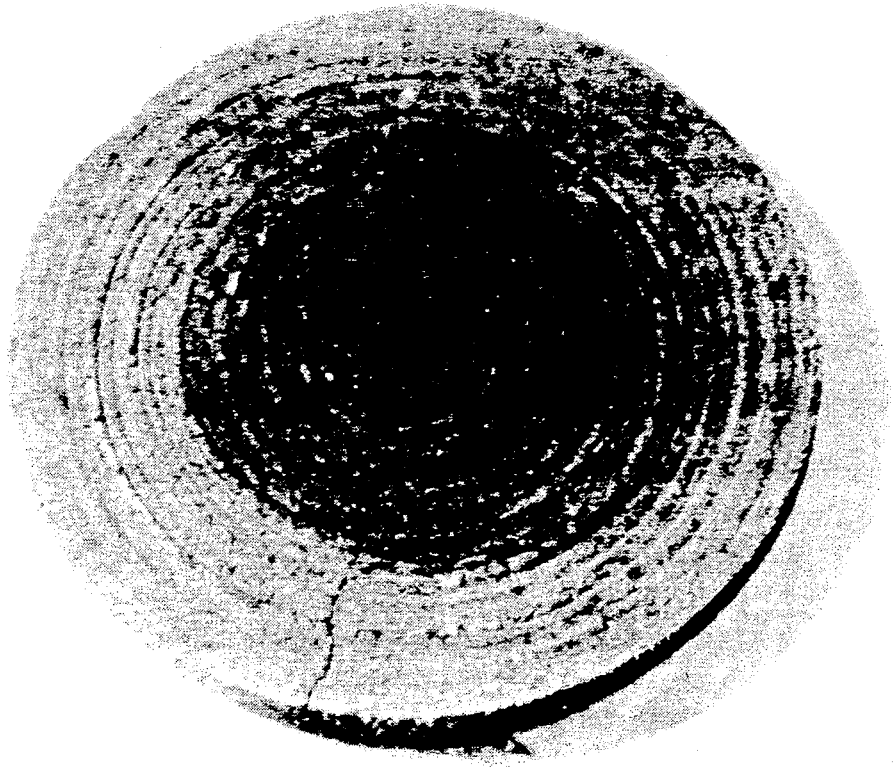
Figure 6:
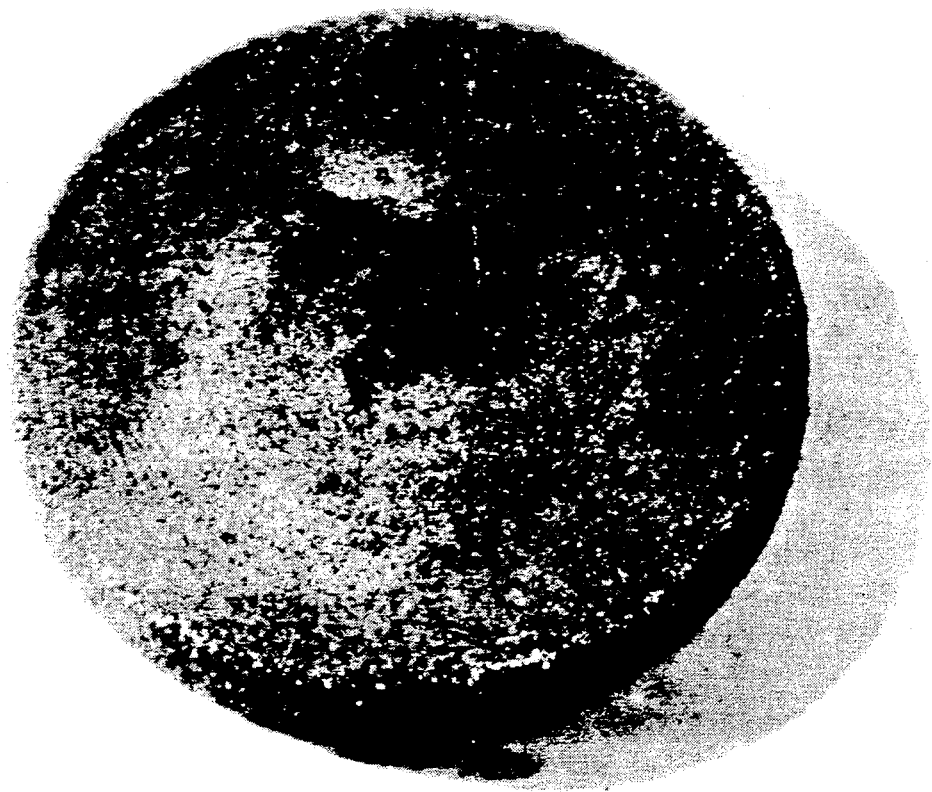

Other objects, advantages and features of the present invention will become apparent to those skilled in the art from the following discussion.

DESCRIPTION OF THE PREFERRED EMBODIMENTS

The novel method of this invention arose from a desire of the inventors to improve on prior art methods for preparing ceramic monoliths requiring complex multiple steps and expensive technology. The advantages of this process are multiple. They include inexpensive starting materials, localized energy deposition in the substrate which minimizes wall effects, good shape retention, rapid processing (e.g., a few hours) and, inter alia, the elimination of steps such as powder synthesis, calcining and sintering, which are conventional in prior art methods.

Moreover, considerable control over the reaction-sintering process can also be attained. For example, the surface of the preformed substrate can be cleaned of oxides, to thereby enhance reactivity of the substrate materials by laser heating in the presence of a reducing atmosphere such as H$_2$ gas. This gas may be added either simultaneously with the reactant gas or as a step prior to exposure of the substrate to the reactant gas. Densification can also be improved by reducing the size of the substrate particles, increasing the power density of the laser beam, and providing different sample support designs to permit constant pressure gas infiltration.

Thus, a recently developed thermal and pressure gradient CVD technique for densification of fiber composites is hereby applied to the manufacture of ceramics monoliths (D. P. Stinton, A. J. Caputo and R. A. Lowden, "Synthesis of Fiber Reinforced SiC Composites by Chemical Vapor Deposition", Amer. Cer. Soc. Bull., 65: 347 (1986); A. J. Caputo and W. J. Lackey, "Fabrication of Fiber Reinforced Ceramic Composites by Chemical Vapor Infiltration", Ceram. Eng. Sci. Proc. 5:654 (1984)), the portions of the texts of which references describing conditions for practicing the thermal and pressure gradient CVD method are incorporated herein by reference).

Controlled scanning of the laser beam over the entire body of the substrate allows a progressive densification of large substrates outwardly from the center of the substrate. In addition, reaction rates between the substrate materials and the reactant gas may be enhanced if the reactant gas can be activated. Activation can be obtained by coupling the reactant gas with the laser energy by methods known in the art.

Alternatively, laser-transparent gases can be activated in an adjacent microwave or RF plasma prior to exposure to the substrate. Further applications of LACVI to surface modifications, the fabrication of fiber reinforced composites and thin films are also possible.

The method of this invention is particularly suited for forming a ceramic monolith and comprises exposing a pre-formed metal substrate to a NaCl filtered continuous wave laser beam of about 50 to 200 W power and about 80 to 315 W/cm$^2$ power density in an atmosphere of a gas desired to react with the metal;

allowing for the gas to diffuse into the metal substrate at a temperature effective to permit reaction thereof to form the ceramics monolith; and cooling the monolith.

A broad range of conditions may be utilized for practicing this method. However, the following are preferred.

In a preferred form of the method, the diffusion of the gas into the metal is conducted at a temperature about of 1,200 to 1,500° C., and more preferably about 1,300 to 1,400° C.

Moreover, the gas may be a laser-transparent gas and when such a gas is utilized the method is practiced by pre-activating the gas by exposure to microwave or RF plasma prior to its being contacted with the substrate. These are technologies which are known in the art and need not be further described herein.

The method may be practiced in a static reactant gas environment as exemplified herein or in a flowing reactant gas environment.

In addition to the above steps, the method of the invention may comprise a further step of cleaning the surface of the metal substrate from oxides formed by exposure to air. The cleaning step may be conducted by heating in a reducing atmosphere. A particularly suited reducing atmosphere is that made of hydrogen gas. This step may be conducted by heating prior to exposure of the substrate to the laser beam, or alternatively simultaneously by adding the reducing gas, e.g., hydrogen gas, to the alloying or reactant gas prior to exposing the substrate to the laser beam. The conditions for practicing either step are known in the art and need not be described herein in further detail.

In a particularly preferred embodiment of the method of the invention, the entire body of the substrate is scanned by the laser beam to thereby promote progressive outward densification from the center of the substrate towards its surface. This may be attained by rotating the substrate or by randomly moving the substrate while maintaining it positioned in the path of the laser beam.

In another particularly preferred embodiment of the method of the invention, the gas is maintained at a pressure of about 300 to 800 torr, and more preferably about 500 to 700 torr. Once the substrate is placed in the chamber, the atmosphere of the chamber may be evacuated and the alloying or reactant gas alone or along with a reducing gas, may be introduced into the chamber, preferably in an excess of about 2 to 6 fold molar equivalent with respect to the substrate. The excess of reactant gas is intended for attaining the diffusion of the gas throughout the body of the substrate and to promote the reaction therebetween. In a particularly preferred form of producing this method, the gas is maintained at a constant pressure.

A number of gasses are known in the art to be suitable for alloying with substrates. Examples of alloying gasses are hydrocarbons such as methane, $(CN)_2$ and nitrogen gas. However, other gasses may also be utilized as is known in the art. The substrate from which the monolith is to be formed may be composed of a variety of metal elements. Examples of these elements are silicon, titanium, molybdenum, tungsten and the like. However, others are also suitable as is known in the art.

By practicing the method of this invention, typical ceramics monoliths are obtained which have a density of about 50 to 70% of theoretical density, and are about 50 to 80 reacted with the gas. That is, 50 to 80% of reaction of the metal substrate with the gas has occurred.

Having now generally described this invention, the same will be better understood by reference to certain specific examples, which are included herein for purposes of illustration only and are not intended to be limiting of the invention or any embodiment thereof, unless otherwise specified.

EXAMPLES

Example 1: Preparation of Monolith in Accordance with the Process of the Invention 325 mesh and finer metal powders of different compositions are dry pressed into various shapes to suit the intended use of the final product. For purposes of demonstration miniature piston crowns, hollow cylinders (bushings) and discs having the approximate dimensions 1 cm diameter 0.5 cm height are formed in steel dies from Si, Mo, W and Ti powders.

A preformed, preweighed specimen is placed on a support within a reaction chamber as shown in FIG. 1. The chamber is evacuated to $10^{-6}$ torr ($1.3 \times 10^{-4}$ Pa) and refilled to a pressure of 300–800 torr (40–107 Pa) with a 2–6 fold excess of reactant gas. The reactant gas is then allowed to infiltrate the porous preform.

Reactant gases are selected according to substrate to produce the desired ceramic, e.g., $CH_4$ is used with Si to generate SiC, Ti with $(CN)_2$ to generate TiN, etc.

Energy from a continuous-wave $CO_2$ laser $\sim 10.6$ $\mu$m) is directed through a NaCl window placed on the reactor and made to impinge on the shaped substrate, rapidly bringing the solid substrate to reaction temperature.

Typical parameters and conditions are as follows.
Laser power 50–200 W,
Beam diameter 0.9 cm,
Power reaction time 20–60 min.

At the conclusion of the reaction period, the reactor is cooled to room temperature and volatile materials are removed from the chamber. The reacted monolith is weighed and further characterized by X-ray diffraction. Weight changes and X-ray data are used to estimate the percentage of substrate which is reacted.

Example 2: Ceramics Monoliths Prepared in Accordance with the Present Invention

FIGS. 2-6 show prototype finished products made by the method of the invention. These are a SiC bushing, a SiC piston crown, $SiC/Si_3N_4$ bushing, a $Mo_2C$ disc and a WC disc, respectively. These monoliths typically have a density which is 50–70% of theoretical density and are 50–80 wt % reacted.

For the Si substrate preferred infiltrated reactant gasses such as $CH_4$ or $(CN)_2$ give either SiC or the composite $SiC/Si_3N_4$, respectively.

Titanium nitride monoliths can also be fabricated in a similar fashion by reacting a pressed Ti substrate with either $(CN)_2$ or $N_2$ gasses. It is particularly noteworthy that good shape retention is achieved in all cases.

The invention now being fully described, it will be apparent to one of ordinary skill in the art that many changes and modifications can be made thereto without departing from the spirit or scope of the invention as set forth herein.

I claimed:
1. A method of forming a porous ceramic monolith of predetermined shape and porosity, comprising
    compacting a metal powder;
    dry pressing the compacted metal powder under conditions effective to obtain a porous metallic substrate of predetermined shape and porosity;
    evacuating the atmosphere around the substrate;
    contacting the substrate with an excess of a reactive non-metallic gas under a pressure effective to infiltrate the gas throughout the porous structure of the substrate;
    irradiating the gas-infiltrated porous substrate with a continuous laser beam under conditions effective to react about 50 to 80% of the metal throughout the substrate with the non-metallic gas and promote a progressive outward densification from the center of the substrate to the surfaces thereof resulting in a porous ceramic monolith of predetermined shape and porosity and about 50–70% of theoretical density; and
    cooling the porous ceramic monolith.
2. The method of claim 1, wherein
    the metal powder is selected from the group consisting of molybdenum, tungsten, silicon and titanium powders and mixtures thereof.
3. The method of claim 1, wherein
    the non-metallic gas is selected from the group consisting of hydrocarbons, $(CH_2)$, nitrogen and mixtures thereof.
4. The method of claim 3, wherein
    the hydrocarbon is methane.
5. The method of claim 1, wherein
    the irradiation step is conducted at a temperature of about 1,200° to 1,500° C. under a gas pressure of about 300 to 800 torr.
6. The method of claim 1, wherein
    the contacting and irradiating steps are conducted in the presence of an about 2 to 6 fold molar equiva- lent excess of the non-metallic gas with respect to the substrate.

7. The method of claim 1, further comprising prior to the contacting step
obtaining a non-metallic gas that is laser-transparent; and
irradiating the laser-transparent gas with microwaves or RF plasma to activate the gas.

8. The method of claim 1, further comprising heating the metallic substrate under a reducing atmosphere to clean the porous and outer surfaces of the substrate.

9. The method of claim 8, wherein the heating step is conducted prior to the contacting step.

10. The method of claim 8, wherein the heating step is conducted simultaneously with the irradiation step.

11. The method of claim 1, wherein the contacting and irradiating steps are conducted at constant pressure.

12. The method of claim 1, wherein the irradiation step is conducted by scanning the entire substrate with a laser beam of about 50 to 200 W power and about 80 to 315 W/cm$^2$.

13. The method of claim 1, wherein the non-metallic gas and the metallic powder are selected from the group consisting of hydrocarbon/silicon, $(CN)_2$/silicon, $(CN)_2$/titanium, $N_2$/titanium, $CH_4$/molybdenum and $CH_4$/tungsten.

14. A porous ceramic monolith of predetermined shape and porosity having a density of about 50–70% of theoretical density and about 50 to 80% of metal reacted with a non-metallic gas, the monolith obtained by the method of claim 1.

* * * * *